United States Patent
Dessapt et al.

(10) Patent No.: US 11,787,348 B2
(45) Date of Patent: Oct. 17, 2023

(54) VEHICLE INTERIOR PANEL HAVING A DOCKING STATION FOR A MOBILE DEVICE

(71) Applicant: Faurecia Interior Systems, Inc., Auburn Hills, MI (US)

(72) Inventors: Thomas Dessapt, Auburn Hills, MI (US); Cedric Ketels, Mountain View, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 139 days.

(21) Appl. No.: 17/380,691

(22) Filed: Jul. 20, 2021

(65) Prior Publication Data

US 2023/0026523 A1 Jan. 26, 2023

(51) Int. Cl.
B60R 11/02 (2006.01)
B60R 13/02 (2006.01)
B60R 11/00 (2006.01)

(52) U.S. Cl.
CPC ...... *B60R 11/0241* (2013.01); *B60R 13/0262* (2013.01); *B60R 2011/0007* (2013.01); *B60R 2011/0085* (2013.01)

(58) Field of Classification Search
CPC ............. B60R 11/0241; B60R 13/0262; B60R 2011/0007; B60R 2011/0085; B60R 16/037; B60R 16/03; B60R 7/08; B60R 7/04; B60R 11/0235; B60R 11/0252; B60R 2011/0017; B60R 2011/0087; B60N 3/101; B60N 3/105; B60N 3/104; B60N 3/108; H02J 7/02; H02J 50/10; H02J 50/40;

(Continued)

(56) References Cited

U.S. PATENT DOCUMENTS 6,739,654 B1 * 5/2004 Shen ................... B60R 11/0235
                                                          297/188.05
9,788,021 B2   10/2017 Margis et al.
9,880,962 B2    1/2018 Tuccinardi et al.
(Continued)

FOREIGN PATENT DOCUMENTS

CN        204161242 U    2/2015
DE      102012024430 A1  6/2014
(Continued)

OTHER PUBLICATIONS

European Search Report corresponding to application EP 22184466.5, dated Dec. 19, 2022, 7 pages.

*Primary Examiner* — Lester G Kincaid
*Assistant Examiner* — Maryam Soltanzadeh
(74) *Attorney, Agent, or Firm* — REISING ETHINGTON P.C.

(57) ABSTRACT

A vehicle interior panel includes an in-vehicle support substrate and a docking station for a mobile device. The docking station includes a top edge, a bottom wall, and a reception surface for the mobile device between the top edge and the bottom wall. The reception surface is pivotably attached with respect to the support substrate. A first portion of the bottom wall is configured to hold the mobile device, and a second portion of the bottom wall is configured to remain recessed within the support substrate when the docking station is in a tilted position. This structure for a docking station helps improve within vehicle integration.

15 Claims, 2 Drawing Sheets

(58) Field of Classification Search
CPC .......... H02J 50/70; H02J 7/0044; H02J 50/00; H02J 50/90
See application file for complete search history.

(56) References Cited

U.S. PATENT DOCUMENTS

| | | |
|---|---|---|
| 2007/0222248 A1 | 9/2007 | Maulden et al. |
| 2013/0200119 A1* | 8/2013 | Ackeret .................. B60R 7/04 224/275 |
| 2014/0124644 A1 | 5/2014 | Wong et al. |
| 2016/0280375 A1* | 9/2016 | Heredia .............. G06F 3/04886 |
| 2019/0381950 A1 | 12/2019 | Morrison |
| 2020/0223366 A1 | 7/2020 | Heinz |
| 2021/0316648 A1* | 10/2021 | Kim ....................... B60R 16/03 |

FOREIGN PATENT DOCUMENTS

| | | |
|---|---|---|
| EP | 3680133 A1 | 7/2020 |
| FR | 3085641 A1 | 3/2020 |
| WO | 2015032391 A1 | 3/2015 |
| WO | 2018100407 A1 | 6/2018 |

* cited by examiner

VEHICLE INTERIOR PANEL HAVING A DOCKING STATION FOR A MOBILE DEVICE

TECHNICAL FIELD

The present disclosure is related generally to vehicle interiors and, more particularly, to vehicle interior components having an integrated mobile device docking station.

BACKGROUND

Docking stations for mobile devices are common in vehicles. However, they are often aftermarket add-on parts or parts within the vehicle that do not have the same look and feel as the overall interior cabin. For example, DE 10 2012 024 430 to Wittorf et al. shows a mobile device holder that is slidably integrated within a console. However, the mobile device holder does not match the aesthetic of the rest of the console, and it may not be immediately accessible to a user in the rear of the vehicle if it is in its fully recessed position. This may not be desirable in situations such as with ride share vehicles, where improved access to passenger vehicle features is of particular benefit.

SUMMARY

An illustrative vehicle interior panel comprises a support substrate configured for in-vehicle operation and a docking station for a mobile device. The docking station comprises a top edge, a bottom wall, and a reception surface for the mobile device between the top edge and the bottom wall. The reception surface is pivotably attached with respect to the support substrate. A first portion of the bottom wall is configured to hold the mobile device, and a second portion of the bottom wall is configured to remain recessed within the support substrate when the docking station is in a tilted position.

In various embodiments, an outer surface of the bottom wall is completely covered by the support substrate when the docking station is in a fully recessed position.

In various embodiments, the reception surface is accessible for use in the fully recessed position.

In various embodiments, the docking station comprises a side tilt surface that extends from the bottom wall.

In various embodiments, the side tilt surface has a substrate and a first decorative covering, and the side tilt surface is only visible within an interior passenger cabin when the docking station is in the tilted position.

In various embodiments, the first decorative covering covers an outer surface of the bottom wall and at least part of the support substrate.

In various embodiments, a second decorative covering covers the reception surface.

In various embodiments, the first decorative covering is a polymeric, fabric, or natural skin layer and the second decorative covering is a wood veneer layer.

In various embodiments, a pivoting hinge is located at or near the top edge of the docking station.

In various embodiments, the first portion of the bottom wall of the docking station includes a retaining groove.

In various embodiments, the docking station includes an adjustable height bracket.

In various embodiments, the adjustable height bracket includes an ambient light.

In various embodiments, a wireless charger for the mobile device is located behind the reception surface.

In various embodiments, a center console comprises the vehicle interior panel, and the docking station faces a rear seating area of an interior passenger cabin.

In various embodiments, a tilt angle between the tilted position and a fully recessed position is between 15° and 20°, inclusive.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a docking station having a more integrated and streamlined appearance within a vehicle interior cabin. In an advantageous embodiment, a vehicle interior panel, such as an instrument panel or a center console, includes the docking station integrated with an in-vehicle support substrate. To achieve a more streamlined appearance, the docking station is strategically recessed within the in-vehicle support substrate, and is able to tilt between a fully recessed position and a tilted position to promote user accessibility. Decorative coverings can be selectively implemented in certain locations to improve the vehicle aesthetics, compared to more typical aftermarket docking stations. Moreover, certain features, such as strategically located ambient lighting within an adjustable height bracket, can create a more intuitively useable docking station without detracting from the overall look and feel of the interior cabin.

Figure 1:
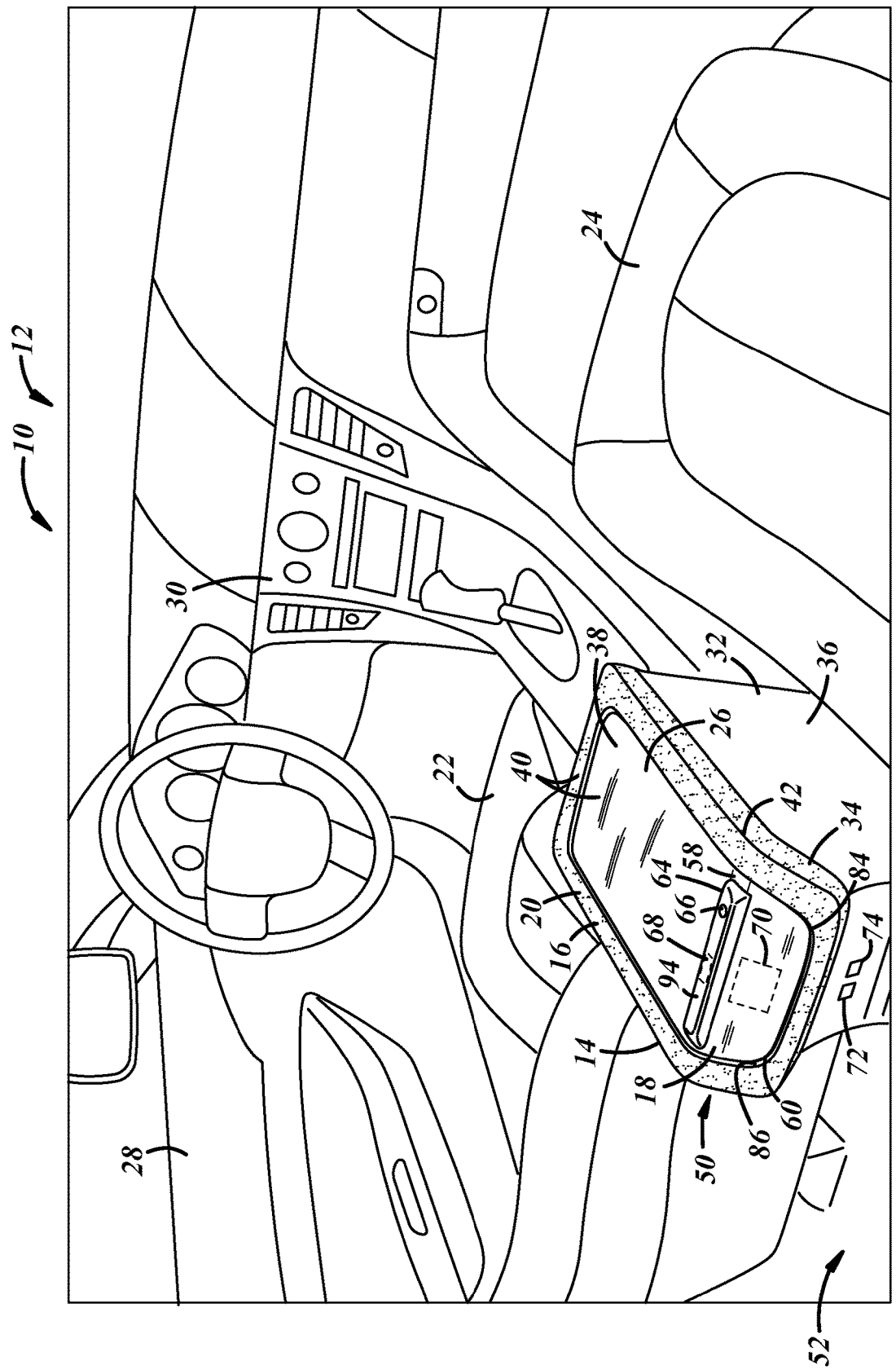
FIG. 1 is a perspective view of an example of a docking station integrated in a center console of a vehicle.

FIG. 1 is a partial perspective view of an interior cabin 10 for a vehicle 12 having a vehicle interior panel 14 with an in-vehicle support substrate 16 and a docking station 18 for a mobile device. The docking station 18 is integrated with the in-vehicle support substrate 16, which in this embodiment, is a center console 20. Thus, the interior panel 14 in the illustrated embodiment comprises the center console 20 of the vehicle 12. The console 20 is typically employed adjacent individual seats in a vehicle passenger cabin, such as between the driver seat 22 and the passenger seat 24 in a front row of seating or between passenger seats in another row of seating. Such consoles can offer a resting surface 26, which may provide armrests and/or table-top like surfaces to vehicle occupants. In some embodiments, other features are included, such as extra cushions, storage compartments, cup holders, etc., which help provide other conveniences for vehicle occupants. While the discussion herein is focused on the center console 20 implementation, other interior panels for vehicle components may be integrated with the docking station 18 described herein, such as one or more panels for another armrest, a door panel 28, or the instrument panel 30, to cite a few examples.

The in-vehicle support substrate 16 includes a carrier 32 that is the physical support layer of the panel 14, and a first decorative covering 34 covering all or a portion of the carrier 32. The carrier 32 is typically the most rigid of the illustrated layers of the multi-layer assembly and thereby provides structural support for the overlying decorative covering layer(s) at desired locations within the vehicle 12. The carrier 32 has an outer surface 36 that faces towards the interior cabin 10 and toward an inner surface of the decorative covering 34. The inner surface or the outer surface 36 of the carrier 32 can include various bosses, ribs, grooves, etc. that impart structural benefits and/or promote attachment to other components of the vehicle 12. Fiberglass-reinforced polypropylene having a thickness of 1.6 mm to 4 mm is one example of a suitable carrier 32, but various other types of materials and material combinations and/or different thickness ranges can be employed in a similar manner (e.g., ABS and/or PC). The support substrate 16 is configured for in-vehicle operation, either by forming a structural component of the vehicle 12, being directly integrated with a vehicle component in the interior cabin 10, or providing some other vehicle-based functionality besides just holding a mobile device.

The support substrate 16 includes the first decorative layer 34, and this embodiment also has a second decorative layer 38 lining another portion of the carrier 32. Both decorative layers 34, 38 have a decorative side 40, which is the side of the panel 14 lining the interior of the passenger cabin 10 when installed in the vehicle 12. In this embodiment, the first decorative layer 34 lines an upper outer perimeter 42 of the console 20. In some embodiments, the first decorative layer 34 lines the entirety of the in-vehicle support substrate. In other embodiments, such as that illustrated, the first decorative layer 34 only covers a portion of the carrier 32. One or more other portions may then be left uncovered, or covered in one or more different decorative layers. For example, the second decorative layer 38 is located on the resting surface 26 and the mobile device docking station 18. Each decorative layer 34, 38 can be a single layer, or it may have a multi-layer structure (e.g., a wood veneer layer comprising a wood sheet complex having a fabric interlayer and one or more protective outer layers). Other materials for the decorative layer are certainly possible, such as fiber-containing resins, leather, or a polymeric skin layer, to cite a few examples. When a resin component is included in the decorative layer, it may be colored or tinted for additional contrast or visual interest.

The decorative coverings 34, 38 may have a thickness in a range from 0.5 mm to 2.5 mm, or preferably from 0.5 mm to 1.5 mm. In one example, the thickness of each decorative covering 34, 38 is between 0.6 mm and 1.0 mm, or about 0.8 mm. Other thickness ranges and configurations are certainly possible. For example, each decorative covering 34, 38 may be thicker in certain regions than others, or it may have a curved or non-planar shape. In an advantageous embodiment, the first decorative covering 34 is a softer material, such as a foamed polymeric layer, a fabric or natural skin layer, whereas the second decorative covering 38 is a more rigid material, such as wood veneer. This particular arrangement of decorative coverings 34, 38 can provide for increased cushioning in areas where a passenger's arm is likely to go, while providing a more flat and rigid surface for receiving a mobile device.

Adhesive or bonding layers can be included between two or more of the various layers or components of the interior panel 14. Further, other layers may be included in addition to those particularly described, such as one or more protective outer layers on the decorative side 40, fabric interlayers, conductive electronic layers, or other functional and/or aesthetic layers. In some embodiments, a foam layer is included under the first decorative layer 34 to create a softer feeling surface.

Figure 2:
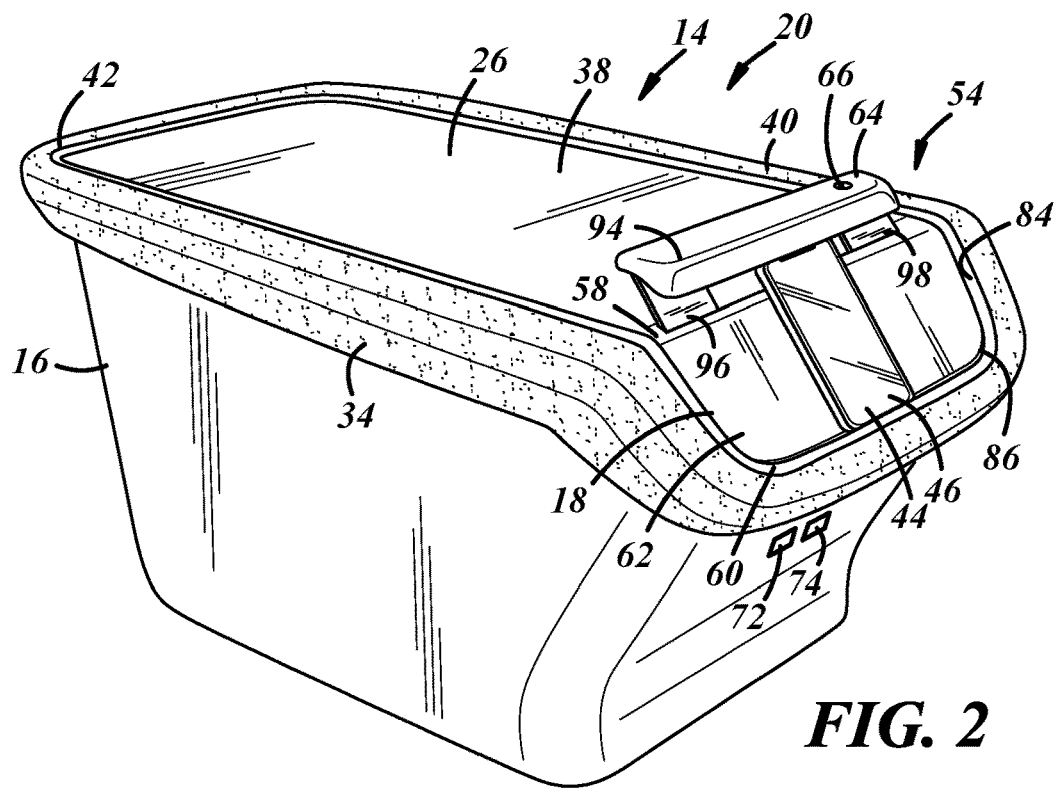
FIG. 2 depicts the center console and docking station of FIG. 1 with a mobile device installed.
Figure 3:
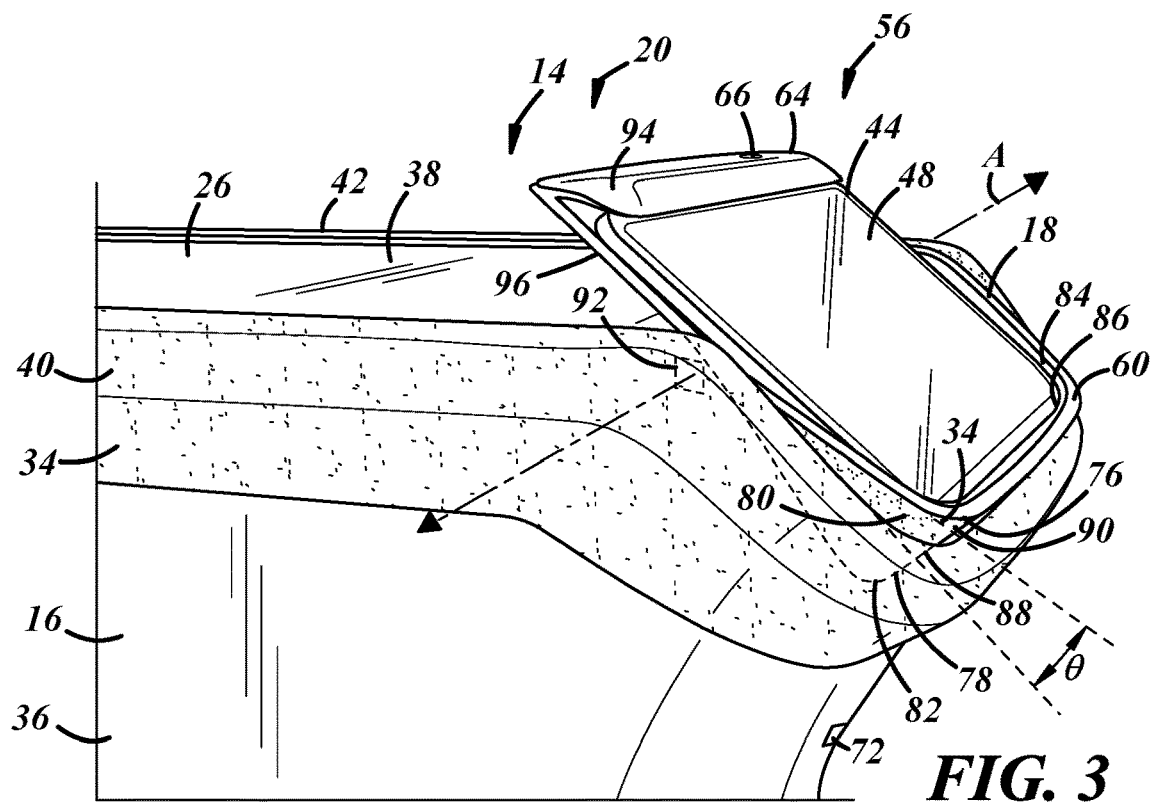
FIG. 3 shows the docking station of FIGS. 1 and 2 in a tilted position.

The docking station 18 is integrated within the vehicle interior panel 14 through tiltable attachment to the in-vehicle support substrate 16. The aesthetic of the docking station 18 can be strategically designed to better match the overall look and feel of the interior cabin 10. Further, the support substrate 16 and the docking station 18 can be precisely built and integrated within the center console 20 in particular to help facilitate intuitive user use. As shown in FIGS. 2 and 3, a number of different mobile devices 44 can be accommodated, with FIG. 2 showing an example phone 46 for the mobile device and FIG. 3 showing an example tablet 48 for the mobile device.

FIG. 1 shows the docking station 18 in a fully recessed resting position 50. The resting position does not have a mobile device 44 loaded in the docking station 18. The docking station 18 is advantageously faced toward a rear seating area 52, so passengers behind the console 20 can reach and stow a mobile device 44 easily. In some embodiments, more than one mobile device 44 may be stowed on the docking station 18 at one time. FIG. 2 shows the docking station 18 is a fully recessed loaded position 54 with the phone 46 as the loaded mobile device 44. This position 54 is similar to the fully recessed resting position 50, as the docking station 18 is fully recessed within the support substrate 16 in both. However, FIG. 2 shows a mobile device 44 loaded in the docking station 18. FIG. 3 illustrates a tilted position 56 for the docking station 18. In some embodiments, this tilted position 56 can be accomplished either when the docking station 18 is loaded with mobile device 44, or unloaded at rest. The fully recessed positions 50, 54 and tilted position 56 are detailed further below.

The docking station 18 includes a top edge 58, a bottom wall 60, and a reception surface 62 between the top edge and the bottom wall. Top and bottom are used herein to locate things as being closer to the roof of vehicle 12 or closer to the floor of the vehicle, respectively. FIGS. 1 and 2 show the top edge 58 and the reception surface 62, but in the tilted position 56 shown in FIG. 3, the top edge and reception surface are not visible because of the position of the docking station 18 and the size of the mobile device 44, respectively. The docking station 18 further includes a number of optional components such as an adjustable height bracket 64, a mechanical lock 66 for the bracket, an ambient light 68 integrated within the bracket, and a wireless charger 70. The docking station 18 may also include one or more charging ports 72, 74, which in the illustrated embodiment, are included on the support substrate 16, but may instead or additionally be included as part of the docking station itself. These optional sub-components are detailed further below.

The bottom wall 60 in the illustrated embodiments has a saddle or cradle-like structure to help retain the mobile device 44 while being easily recessed within the support substrate 16. The bottom wall 60 has an outer surface 76 that is exposed when the docking station 18 is in the tilted position 56, but in either of the fully-recessed positions 50, 54, the outer surface 76 is non-visible within the interior cabin 10 and wholly recessed within the support substrate 16. FIG. 3 more clearly shows the saddle structure of the bottom wall 60, and shows that the outer surface 76 of the bottom wall extends into a side wall 78 and visible side tilt surface 80. Each side of the docking station 18 includes a pie-piece shaped side wall 78 and visible side tilt surface 80, but only one side is visible in the view of FIG. 3. Each side wall 78 and side tilt surface 80 directly face a seat 22, 24 of the vehicle 12 when in the tilted position 56.

The bottom wall 60 and each side wall 78 may be comprised of a rigid substrate 82 which is then covered by the first decorative covering 34. This particular arrangement, where the decorative covering 34 used on the bottom wall 60 and side wall 78 is the same as the decorative covering used on the in-vehicle support substrate 16, can enhance the aesthetic of the vehicle 12 by making the docking station 18 more integrated with the vehicle interior panel 14. The substrate 82 may be made of the same material and in accordance with the teachings relating to the carrier 32, and then covered in a decorative covering. In some implementations, the decorative covering used on the outer surface 76 of the bottom wall 60 and the side wall 78 is not the same as the decorative covering 34 used on the in-vehicle support substrate, but again, matching these decorative coverings can be easier to manufacture and can improve the look and feel of the docking station 18.

The bottom wall 60 also includes a portion 84 configured to hold the mobile device 44. The portion 84 includes a u-shaped, chromed retaining groove 86 that projects outwardly from the reception surface 62. While using a chrome material for at least a portion of the retaining groove 86 can improve the attractiveness of the docking station 18, other materials are certainly possible. For example, the retaining groove 86, given its position adjacent the reception surface 62, may be made from the second decorative layer 38 as well (e.g., wood veneer). The retaining groove 86 may be located in the bottom wall 60 exclusively, or it may extend all the way up each side wall 78. The groove 86 acts as a bezel in this embodiment to frame the lower portion of the docking station 86. The first portion 84 which has the retaining groove 86 is configured to directly contact the mobile device 44, whereas a second portion 88, on an opposing face of the bottom wall 60, is configured to be recessed in the support substrate 16, no matter what the position. An exposed portion 90, also along the outer surface 76 of the bottom wall 60, is visible within the interior cabin 10 in the tilted position 56. Together, the second recessed portion 88 of the bottom wall 60 and the exposed portion 90, make up the outer surface 76.

To achieve the tilted position 56, a pivoting friction hinge 92 can be used near the top edge 58. Locating the hinge 92 near the top edge 58 can advantageously increase the tilt angle θ as compared to hinge locations located closer to the bottom wall 60 than what is illustrated. As used herein, near the top edge 58 means that the hinge point is located closer to the top edge than to the bottom wall 60. The pivoting friction hinge 92 provides for rotation of the docking station 18 about the axis A. Other hinge types for effectuating tilting are certainly possible, but use of a friction hinge can be beneficial as it can hold the docking station 18 at a desired tilt angle θ. Advantageously, the tilt angle θ between the tilted position 56 and the fully recessed position 50, 54 is between about 15° and 20°, inclusive. This particular angular range for the tilt angle θ is typically more comfortable to a user in the rear seating area 52, and can be adjusted by the user to account for glare, height of the user, etc. The desired range for the tilt angle θ however, may depend on the position of the docking station 18 at one of the fully recessed positions 50, 52. For example, a more sloped reception surface 62 may have a smaller range for the tilt angle, whereas a more perpendicularly oriented reception surface with respect to the structure of the console 20 may have a larger range for the tilt angle. A space can be provided behind the top edge 58 to provide room for tilting, or there may be some downward motion at the hinge point 92 that occurs when the bottom wall 60 rotates outward.

The reception surface 62 defines an area exposed to the interior cabin 10 of the vehicle 12 where the user can intuitively place the mobile device 44. The reception surface 62 is generally bounded by the top edge 58, the side walls 78, and the bottom wall 60. The reception surface 62 is advantageously a more planar, rigid structure, and includes the second decorative covering 38 (e.g., wood veneer). The planar structure may facilitate improved wireless charging, for example. In some embodiments, a rubberized or gripping material may be used for all or some of the reception surface 62. For example, rubber edges in sections of about 1 mm long could create sidewalls to help reduce lateral movement of the mobile device 44. Preferably, the reception surface 62 is available to a user whether the docking station 18 is in a fully recessed position 50, 54 or in the tilted position 56. This arrangement can promote accessibility of the docking station 18.

An adjustable height bracket 64 can be included to promote stable retention of a variety of differently sized mobile devices 44 at the docking station 18. The adjustable height bracket 64 includes an overhang 94 that spans between sliders 96, 98 (see FIG. 2). In some embodiments, the overhang 94 may be located on a single slider. Including two sliders 96, 98, however, can provide space for the wireless charger 70. An underside of the overhang 94 can include a rubberized material to further enhance retention, and a decorative covering can be used on the surface exposed to the interior cabin 10. In some embodiments, the overhang 94 may be adjustable to accommodate mobile devices 46 of varying thicknesses.

The adjustable height bracket 64 in the illustrated embodiment includes a mechanical lock 66 that retains the overhang 94 in the resting position 50. Depressing or switching the mechanical lock 66 can release a detent or the like that retains spring-loaded or otherwise biased sliders 96, 98. In some embodiments, adjustment may be facilitated in an alternate fashion, such as turning a knob to change the position of the sliders 96, 98 with respect to the docking station 18. In yet other embodiments, there may be no mechanical advantage used to help ease the change in respective positions 50, 54, 56.

An ambient light source 68, as shown schematically in FIG. 1, can be included to help a user intuitively guide the mobile device 44 to the docking station 18 and/or the wireless charger 70. The light source 68 can be powered by a vehicle-based power source, along with the wireless charger 70. The light source 68 can be any operable light source (e.g., fiber optic, fluorescent or incandescent bulb, light emitting diode (e.g., LED or OLED), etc.), the position of which may be at least partially dictated by the structure of the panel 14. For example, instead of being integrated with the adjustable height bracket 64, light may be emitted from and around the retaining groove 86. The light source 68 may only provide a single light color, or it may provide multiple colors.

In some embodiments, a wireless charger 70 can be included behind the reception surface 62 to wirelessly charge the mobile device 44. The range of the wireless charger 70 generally defines the size and shape of the wireless charging area on the decorative side 40 of the decorative layer 38 (along with other factors, including but not limited to, the ability of the materials of the panel 14 to allow for the transmission of wireless power). The wireless charger 70 can be an integral component of the panel 14, or it may be separately provided beneath the panel when installed in the vehicle 12. The wireless charger 70 typically consists of one or more coils and electronics. It may be advantageous to embed the coils into the panel 14 (e.g., into the substrate 82 or in-between layers) so that they are closer to the decorative side 40 of the decorative layer 38, which can increase the size of the wireless charging area on the reception surface 62. The wireless charger 70 can be powered by a vehicle-based power source and may further include haptic feedback capability, such as a piezoelectric oscillator that causes vibrations to be induced in the panel 14 when triggered by touch, proximity, or other input.

In some embodiments, other power sources may be included on or near the panel 14, such as charging ports 72, 74. The charging ports 72, 74 may be standardized connectors, such as USB, a plug to fit a conventional 12V-DC automotive socket, or a 110V-AC plug, for example. External wiring and/or internal wiring can electrically interconnect the vehicle or other external power source with the charging ports 72, 74. In some embodiments, an internal power source such as a rechargeable battery pack is built-in to the base of the console 20.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel, comprising:
a support substrate configured for in-vehicle operation; and
a docking station for a mobile device, the docking station comprising:
a top edge;
a bottom wall having a first portion and a second portion;
a reception surface for the mobile device between the top edge and the bottom wall; and
a pivoting hinge located at or near the top edge of the docking station that attaches the reception surface and the support substrate, wherein the reception surface is pivotably attached via the pivoting hinge with respect to the support substrate, wherein the first portion of the bottom wall is configured to hold the mobile device, wherein the second portion of the bottom wall is configured to remain recessed within the support substrate when the docking station is in a tilted position, and wherein the pivoting hinge is configured to rotate the bottom wall to a fully recessed position.

2. The vehicle interior panel of claim 1, wherein an outer surface of the bottom wall is completely covered by the support substrate when the docking station is in the fully recessed position.

3. The vehicle interior panel of claim 2, wherein the reception surface is accessible for use in the fully recessed position.

4. The vehicle interior panel of claim 1, wherein the docking station comprises a side tilt surface that extends from the bottom wall.

5. The vehicle interior panel of claim 4, wherein the side tilt surface has a substrate and a first decorative covering, and wherein the side tilt surface is only visible within an interior passenger cabin when the docking station is in the tilted position.

6. The vehicle interior panel of claim 5, wherein the first decorative covering covers an outer surface of the bottom wall and at least part of the support substrate.

7. The vehicle interior panel of claim 4, wherein a second decorative covering covers the reception surface.

8. The vehicle interior panel of claim 7, wherein the first decorative covering is a polymeric, fabric, or natural skin layer and the second decorative covering is a wood veneer layer.

9. The vehicle interior panel of claim 1, wherein the first portion of the bottom wall of the docking station includes a retaining groove.

10. The vehicle interior panel of claim 1, wherein the docking station includes an adjustable height bracket.

11. The vehicle interior panel of claim 10, wherein the adjustable height bracket includes an ambient light.

12. The vehicle interior panel of claim 1, wherein a wireless charger for the mobile device is located behind the reception surface.

13. A center console comprising the vehicle interior panel of claim 1, wherein the docking station faces a rear seating area of an interior passenger cabin.

14. The center console of claim 13, wherein a tilt angle between the tilted position and a fully recessed position is between 15° and 20°, inclusive.

15. The vehicle interior panel of claim 1, wherein the support substrate includes a carrier that is a physical support layer of the vehicle interior panel and a first decorative covering that covers at least a portion of the carrier.

* * * * *